Inventor
Robert H. Thorner

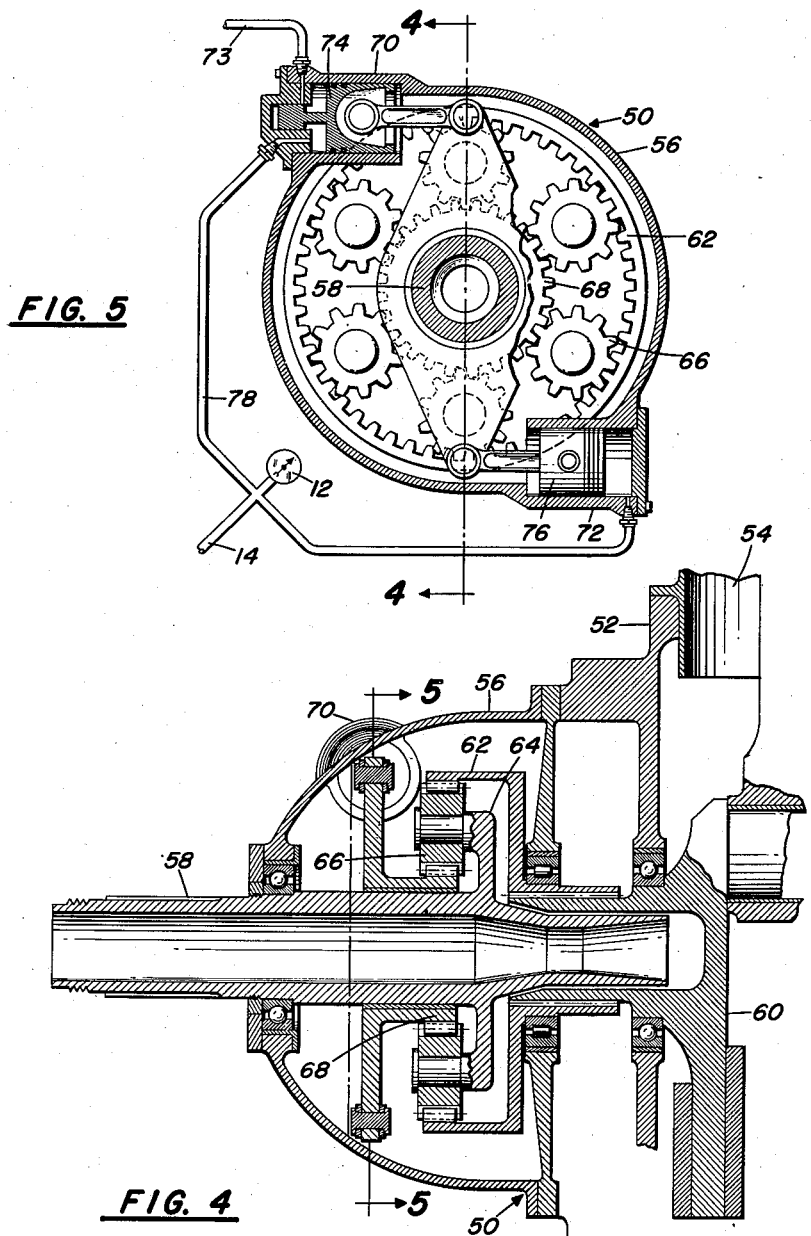

Patented Feb. 5, 1952

2,584,170

UNITED STATES PATENT OFFICE 2,584,170

GOVERNOR MECHANISM

Robert H. Thorner, Detroit, Mich.

Application May 17, 1946, Serial No. 670,402

3 Claims. (Cl. 123—103)

(Granted under the act of March 3, 1883, as amended April 30, 1928; 370 O. G. 757)

The present invention relates to new and useful improvements in control mechanism for internal combustion engines, steam turbines, gas turbines, jet propulsion engines, and more particularly to such improvements in a throttle control mechanism for aircraft engines.

Modern reciprocating internal combustion aircraft engines can be seriously damaged under various operating conditions in that the power developed by the engine depends upon speed, that is RPM and torque, both of which change with varying operating conditions. As an example, during a take-off, the engine may be seriously damaged if the throttle is opened wide or is excessively opened which results in the development of more power than the engine is structurally designed to handle. The horsepower developed by the engine is proportional to the engine RPM times the engine torque so that the control of engine RPM and torque to preselected limits will result in a constant maximum developed power. The engine RPM can be maintained constant by a constant speed propeller and one application of the present invention is concerned with maintenance of constant engine torque for any predetermined condition which may be selected by the pilot. Those skilled in the art will, however, appreciate from the following description that the device of the present invention is broadly applicable to governing the operation of substantially any device which is employed to control a function of operation of an engine, or a device driven thereby, as long as such engine or device driven thereby is provided with pressure producing means, the pressure of which varies with such operation.

For instance, the output of jet propulsion engines is determined by thrust instead of horsepower. Another application of this invention is in governing the throttle of aircraft jet propulsion engines to maintain constant thrust delivered by the engine in flight.

With the above in mind, one of the principal objects of this invention is to effect automatic operation of the engine throttle in an internal combustion engine to maintain preselected power developed during any operating conditions, thus relieving the pilot of the responsibility of maintaining the proper throttle setting during maneuvering or take-off.

Another object of the invention is to control the throttle in an internal combustion engine so as to limit maximum power available during predetermined operating conditions, as in ascending from a take-off, thus relieving the pilot of this manual control.

A further object of this invention is to effect automatic operation of the engine throttle in a jet propulsion engine to maintain preselected constant thrust developed during any operating flight condition.

The invention still further aims to provide a control mechanism of the above type which is relatively simple in construction and reliable in operation.

The above and other objects of the invention will in part be obvious and will be hereinafter more fully pointed out.

In the accompanying drawings:

Fig. 4 is a longitudinal sectional view of an engine nose section incorporating a conventional type of torque meter which may be employed, in accordance with a narrower phase of the invention, as a source of fluid flow at variable pressures, taken on the line 4—4 of Fig. 5; and Fig. 5 is a transverse sectional view taken on the line 5—5 of Fig. 4.

Figures 1, 2, 3:
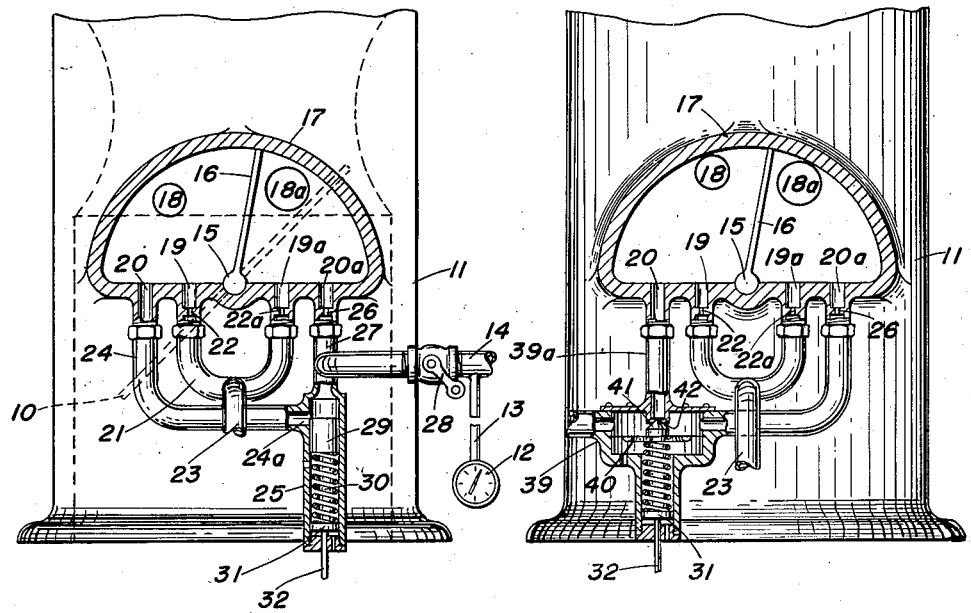
Fig. 1 is a side view of the fuel intake conduit with the throttle actuating mechanism shown partly in section.
Fig. 2 is reduced longitudinal section of Fig. 1, revolved ninety degrees, but schematically showing the addition of certain operating control.
Fig. 3 is a view, similar to Fig. 1, but showing a modified form of throttle control mechanism.

Referring more in detail to the accompanying drawings, and particularly to Figs. 1 and 2 thereof, the invention is illustrated in connection with an internal combustion engine having a throttle valve 10 operating in conventional conduit 11 leading the fuel mixture to the engine (not shown) which may be of any type. The operating force for control mechanism consists of the oil from a conventional engine torque installation including a torque indicator 12 connected by a conduit 13 to the main oil conduit 14. Such installation is shown in detail in Figs. 4 and 5 and will be described later. The power range of operation of the throttle may be set from low cruising power to take-off power, and the normal oil pressures in the torque indicator will vary in this range, for example, from approximately 200 to 650 pounds per square inch.

The throttle 10 is fixed to a rotatable shaft 15 which extends across the conduit 11 and protrudes exteriorly thereof at both ends. The end 15a of the shaft 15 carries a rectangular plate, vane, or blade 16 which snugly fits and operates in an arcuate casing 17 disposed exteriorly of the conduit 11. The vane 16 divides the interior of the casing 17 into two chambers 18, 18a, which vary in size as the plate rotates with the shaft 15 in the manner to be hereinafter pointed out. In each of the chambers 18, 18a, there are provided inner and outer ports 19, 19a, and 20, 20a, respectively. The inner ports 19, 19a are in communication with a conduit 21 through restricted passages 22, 22a, respectively, and the conduit 21 communicates with a further conduit 23 leading to the oil sump. The port 20 is in unrestricted communication with a conduit 24 which leads to a cylinder 25. The port 20a is in communication through a restricted passage 26 with a conduit 27 which is connected to the oil conduit 14 and to the cylinder 25. Thus, when the manual selector valve 28 is open, oil from the torque installation will flow from the conduit 14 to the conduit 27 and into the chamber 18a. Similarly, oil will flow to the conduit 24 and into the chamber 18.

Passage of oil into the chamber 18 is controlled by a valve in the form of a piston 29 operating in the cylinder 25. The valve controls the passage 24a into the conduit 24 and is balanced by a coil spring 30 disposed within the cylinder 25. The spring tends to force the piston upwardly, as viewed in Figs. 1 and 2, and the lower end thereof bears against a disk 31 carried by a control rod 32. The spring 30 is of low rate and has a relatively large number of soft coils which can be compressed manually by the control 32 considerably more than by the relatively short travel of the piston 29 so that, in effect, there is provided an adjustable constant load spring. The restricted openings 22a, 26 are fixed so that the pressure of the oil in chamber 18a is approximately one-half the torque oil pressure in conduit 27 which acts against the piston valve 29; hence, the pressure in chamber 18a is substantially fixed. However, the pressure of the oil in chamber 18 is regulated by the position of the piston valve 29 with respect to the passage or port 24a. Oil escaping from the chambers 18, 18a through the ports 19, 19a, respectively, passes into the conduit 21 and thence through the conduit 23 into the oil sump which is subject to the existing atmospheric pressure.

Referring briefly to Fig. 2, there is provided a manual selector control member 33 adapted to operate a bell crank lever 34 which is diagrammatically illustrated as operatively connected to one arm of another bell crank lever 35 and to a housed coil spring 36 which presses on a friction plate 37. The other arm of the bell crank lever 35 is suitably connected to the valve mechanism 28. When the control member is pulled outwardly (downwardly as viewed in Fig. 2), the valve member 28 is closed and the spring 36 may be compressed so as to force the plate 37 against the center of the manual throttle lever 38, thus applying friction to the throttle lever so that it may be set manually. Closing of the valve 28 shuts off the flow of oil under pressure from the conduit 14, and no pressure will result in the chambers 18, 18a. As diagrammatically shown in Fig. 2, the manual throttle lever 38 is linked to a lever extension 15b at the end of the throttle shaft 15 for manual control of the throttle 10. When the control member 33 is pushed inwardly (upwardly, as viewed in Fig. 2), the valve mechanism 28 is opened and the friction plate 37 is retracted so as to release the application of setting friction against the manual throttle lever 38. Torque oil under pressure is allowed to pass to the automatic control mechanism for the throttle 10. The pilot may adjust the engine torque to the required value by the manual torque control rod 32 which controls initial setting of the load on the spring 30. By compressing the spring 30, the engine torque setting is increased and outwardly pulling the rod 32 will decrease the torque setting. The construction of the spring 30 is such that for any given setting of the manual torque control rod 32, constant torque will be maintained in that the total travel of the piston 29 is relatively small compared to the length of the spring 30, whereas the control rod 32 can be used to compress the spring a distance which is relatively large compared to the length of the spring.

When the valve member 28 is opened to effect automatic torque control according to the torque setting selected by the pilot, oil from the torque oil line 14 will flow under pressure into the conduit 27 and through the restricted port 26 into the chamber 18a and also against the valve piston 29 which controls the size of the port 24a and hence the passage of oil through the conduit 24 into the chamber 18. Oil from the chambers 18, 18a passes out through the restricted openings 22, 22a, respectively, and then through the conduits 21, 23 to the oil sump. By reason of the restricted openings 22a, 26, in the ports 19a, 20a, respectively, the oil pressure in the chamber 18a is approximately one-half the pressure in the conduit 27. However, the pressure in chamber 18 is regulated according to the position of the piston valve 29 with respect to the opening 24a. For any given initial setting of the manual torque control rod 32, the spring load remains substantially constant because of the small travel of the piston 29 in relation to the overall length of the spring 30. The fluid pressure in conduit 27 opposes the spring force and is a direct function of the torque developed by the engine and varies as external forces cause the engine torque to vary. If the fluid pressure is too high for the spring loading, the piston valve 29 is moved downwardly to increase the opening of the port 24a, thus increasing the pressure of the fluid in the chamber 18. This increased pressure will move the vane or plate 16 in a clockwise direction in order to shift the throttle 10 toward a closed position. Such closing movement of the throttle will reduce the engine torque and consequently the oil pressure in conduit 27. Such movement of the throttle continues until the oil pressure against the valve 29 counterbalances the spring 30. If the oil pressure in conduit 27 is too low, the valve 29 moves upwardly under the influence of spring 30 so as to reduce the size of the port 24a, thus reducing the pressure in chamber 18 so that the vane 16 and throttle 10 are moved in a counterclockwise direction opening the air passage so as to increase the engine torque. It will be seen, therefore that the piston valve 29, the spring 30, and the port 24a act as a pressure regulator for controlling the engine torque. The spring 30 is designed so that even when fully compressed for take-off torque, the torque will not exceed predetermined limits below damaging values.

As the aircraft climbs, take-off is maintained in the manner pointed out below. With the propeller operating at constant speed during climbing, the throttles must open gradually to maintain constant torque and power. As the engine torque decreases with altitude, the piston valve 29 moves upwardly, so as to reduce the pressure in chamber 18 until it is low enough to permit the substantially constant pressure in chamber 18a to shift the vane 16 in a counterclockwise direction to open the throttle 10 until the original torque is restored and the oil pressure in conduit 27 again balances the spring 30 at the original setting thereof. Thus, constant power is maintained up to the selected altitude where the throttles are wide open so that as altitude is again increased, the power is reduced.

A slight modification of the valve control mechanism is shown in Fig. 3, but the operation is substantially the same as in Figs. 1 and 2. Thus, the valve or pressure regulator consists of a diaphragm 40 disposed across and within a housing 39 which is in communication with the oil conduit 14. The diaphragm 40 carries a valve member 41 adapted to cooperate with a valve seat 42 at the end of conduit 39a which affords communication with the chamber 18 so that control of the movement of the vane 16 is effected for the purpose outlined above.

In jet propulsion engines equipped with a thrust indicating mechanism that indicates thrust by delivering oil at a pressure which is a function of engine thrust, the throttle control mechanism can be used to maintain such variable factor constant. The mechanism set forth by Figs. 1, 2 and 3 is essentially the same for a jet propulsion installation, except that the conduit 11 usually would conduct only the fuel to the engine; hence the throttle valve 10 regulates the thrust by controlling the fuel flow. Referring to Fig. 1, thrust oil pressure is transferred into conduit 27 through conduit 14. Hence, thrust oil pressure bears on the piston 29 to balance the spring 30 so that the regulating mechanism controls the vane 16 and the throttle 10 to maintain a constant engine thrust in the same manner as the mechanism maintains constant torque in reciprocating internal combustion engines.

Referring particularly to Figs. 4 and 5, the numeral 50 generally indicates an engine which may be an internal combustion engine such as a radial air-cooled engine ordinarily employed for the propulsion of aircraft although the invention is in no way limited in its application to any particular form or type of engine. Such an engine may have a crankcase portion 52 around or along which are arranged a plurality of cylinders 54 and to which are secured the nose section 56. In the conventional arrangement, the propeller shaft 58 projects from the nose piece 56 to carry an aeronautical propeller, not illustrated, and is connected to the engine crankshaft 60 by a suitable speed change gear such as the planetary reduction gear illustrated. Such a reduction gear may include an external annular gear 62 drivingly connected to the crankshaft, a rotatable cage 64 drivingly connected to the propeller shaft and carrying planet gears, as indicated at 66, which mesh with the internal gear teeth of the annular drive gear 62 and with the external gear teeth of a relatively fixed sun gear or reaction gear element 68. As the reaction resisting free rotation of the planet gears 66 is taken by the fixed gear element 68 it will be apparent to those skilled in the art that the force required to restrain this fixed gear element from rotation is a direct measure at all times of the torque developed by the engine. In the illustrated arrangement the force necessary to restrain the fixed gear element 68 against rotation is imparted to a hydraulic torque indicating device certain forms of which are well known to the prior art. Such a device may comprise one or more fixed cylinders as indicated at 70 and 72 secured to or formed integrally with the engine nosepiece 56, and receiving respective pistons, as indicated at 74 and 76, secured by suitable link and arm elements to the gear 68. For a more detailed description of a suitable torque indicating device reference may be had to Patent Number 2,154,489, issued April 18, 1939, to Richard S. Buck, for Vibration Damper. Hydraulic fluid is supplied to the spaces between the pistons and the closed outer ends of the cylinders 70 and 72 through the supply line 73 and these spaces may be connected by suitable fluid conduits, as indicated at 78, with the pressure gauge 12 which may be calibrated in pressure units, or may be calibrated directly in torque units if so desired.

While certain forms of the invention have been shown for purposes of illustration, it is to be clearly understood that various changes in the details of construction and arrangement of parts may be made without departing from the scope of the invention as set forth in the appended claims.

The invention described herein may be manufactured and used by or for the Government of the United States of America for governmental purposes without the payment of any royalties thereon or therefor.

What is claimed is:

1. In an internal combustion engine having means adapted to maintain constant engine speed by varying the load thereon, a torque device to supply fluid under pressure which varies in accordance with engine torque, and a throttle valve in the induction system for regulating the torque, the combination comprising; a torque regulator having first and second variable chambers and a movable wall separating said chambers, means connecting said wall to said throttle valve for effecting movements of the latter in response to movements of the former, means operable within the governed range of operation of said engine continuously open to and supplying said chambers with liquid delivered from said torque device, and means operable in response to variations in pressure in said torque device varying the pressure in the last-mentioned means supplying at least one of said chambers thereby to maintain said wall in a position such that the throttle valve will effect preselected engine torque.

2. The combination as defined by claim 1 wherein the variable chambers are arcuate in shape and the movable wall comprises a swingable vane.

3. A throttle control comprising a throttle body having a throttle valve therein, a motor mounted on said body for actuating said valve, said motor comprising a casing having a swingable vane dividing the casing into two chambers, inlet and outlet orifices having predetermined areas relative to each other associated with one of said chambers, a predetermined area outlet orifice associated with said other chamber, a selectively variable area inlet orifice also associated with said other chamber, a manual throttle control, and valve and clutch means for selectively rendering operation of the throttle valve under control of the motor or the manual throttle control.

ROBERT H. THORNER.

REFERENCES CITED

The following references are of record in the file of this patent:

UNITED STATES PATENTS

| Number | Name | Date |
|---|---|---|
| 1,585,529 | Boving | May 18, 1926 |
| 2,020,847 | Mitereff | Nov. 12, 1935 |

(Other references on following page)

UNITED STATES PATENTS

| Number | Name | Date |
|---|---|---|
| 2,053,797 | King | Sept. 8, 1936 |
| 2,166,206 | Benson | July 18, 1939 |
| 2,197,743 | Crafts et al. | Apr. 16, 1940 |
| 2,204,639 | Woodward | June 18, 1940 |
| 2,204,640 | Woodward | June 18, 1940 |
| 2,210,916 | Kenyon | Aug. 13, 1940 |
| 2,219,229 | Kalin | Oct. 22, 1940 |
| 2,248,245 | MacClain | July 8, 1941 |
| 2,302,109 | Dodge | Nov. 17, 1942 |
| 2,303,317 | Berges | Dec. 1, 1942 |
| 2,303,998 | Holley | Dec. 1, 1942 |
| 2,322,303 | Martin | June 22, 1943 |
| 2,336,844 | Buck | Dec. 14, 1943 |
| 2,356,679 | Mallory | Aug. 22, 1944 |
| 2,369,397 | Kostenick | Feb. 13, 1945 |
| 2,389,003 | Schorn | Nov. 13, 1945 |
| 2,392,262 | Ramsey | Jan. 1, 1946 |
| 2,397,658 | Goddard | Apr. 2, 1946 |
| 2,403,399 | Reggio | July 2, 1946 |
| 2,450,037 | Dulong | Sept. 28, 1948 |

FOREIGN PATENTS

| Number | Country | Date |
|---|---|---|
| 852,019 | France | Oct. 16, 1939 |